United States Patent [19]

Hedenberg

[11] 4,379,572
[45] Apr. 12, 1983

[54] UNIVERSAL AIR SUSPENSION SYSTEM

[76] Inventor: William E. Hedenberg, 490 Buffalo Grove, Buffalo Grove, Ill. 60090

[21] Appl. No.: 149,008

[22] Filed: May 12, 1980

[51] Int. Cl.³ ............................................. B60G 11/26
[52] U.S. Cl. ..................................... 280/711; 280/713
[58] Field of Search ............... 280/711, 712, 713, 714, 280/702, 703

[56] References Cited

U.S. PATENT DOCUMENTS

| | | | |
|---|---|---|---|
| 2,865,652 | 12/1958 | Easton | 280/713 |
| 2,879,077 | 3/1959 | Chalmers | 280/711 |
| 3,510,149 | 5/1970 | Raidel | 280/712 |
| 3,917,307 | 11/1975 | Shoebridge | 280/702 |
| 4,114,923 | 9/1978 | Raidel | 280/711 |
| 4,132,433 | 1/1979 | Willetts | 280/712 |
| 4,145,067 | 3/1979 | Ceriani | 280/714 |
| 4,181,323 | 1/1980 | Raidel | 280/711 |
| 4,206,934 | 6/1980 | McKee | 280/714 |
| 4,238,128 | 12/1980 | McKee | 280/714 |

Primary Examiner—Joseph F. Peters, Jr.
Assistant Examiner—John A. Carroll
Attorney, Agent, or Firm—Wallenstein, Wagner, Hattis, Strampel & Aubel, Ltd.

[57] ABSTRACT

An air suspension system adaptable to various types and sizes of vehicles, including automobiles, trucks, vans and the like, to improve their riding characteristics and stability, including a carrier arm assembly pivotally mounted at one end to the frame of the vehicle and connected near its opposite end to the vehicle axle. The system has an air spring disposed between the first pivotal end of the carrier arm assembly and the axle and interposted between the carrier arm assembly and the vehicle frame so that the air spring supports at least the major portion of the vehicle load and responds to any deflection of the wheels mounted at the opposite ends of the axle. The air suspension system is adjustable relative to the axle and the frame to permit alignment of the axle. The system also includes a means of supplying air to the air spring through independent reservoirs and releases air from the air spring at desired rates to control the compressibility of the spring and the riding characteristics of the system. A separate suspension system is mounted on each of the rear wheels of the vehicle and may include a tracking and torque arm means mounted to permit completely independent suspended movement of each wheel.

2 Claims, 14 Drawing Figures

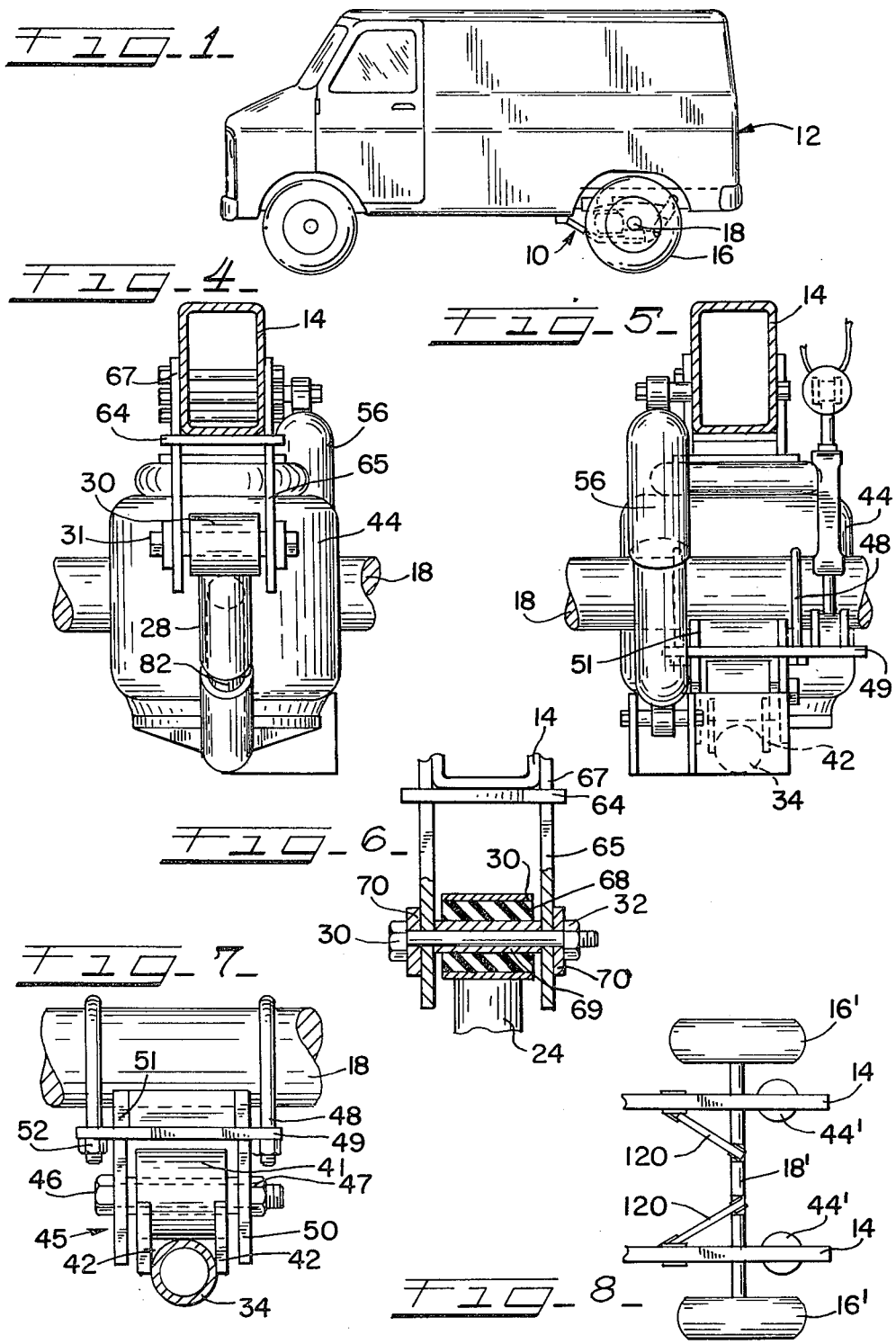

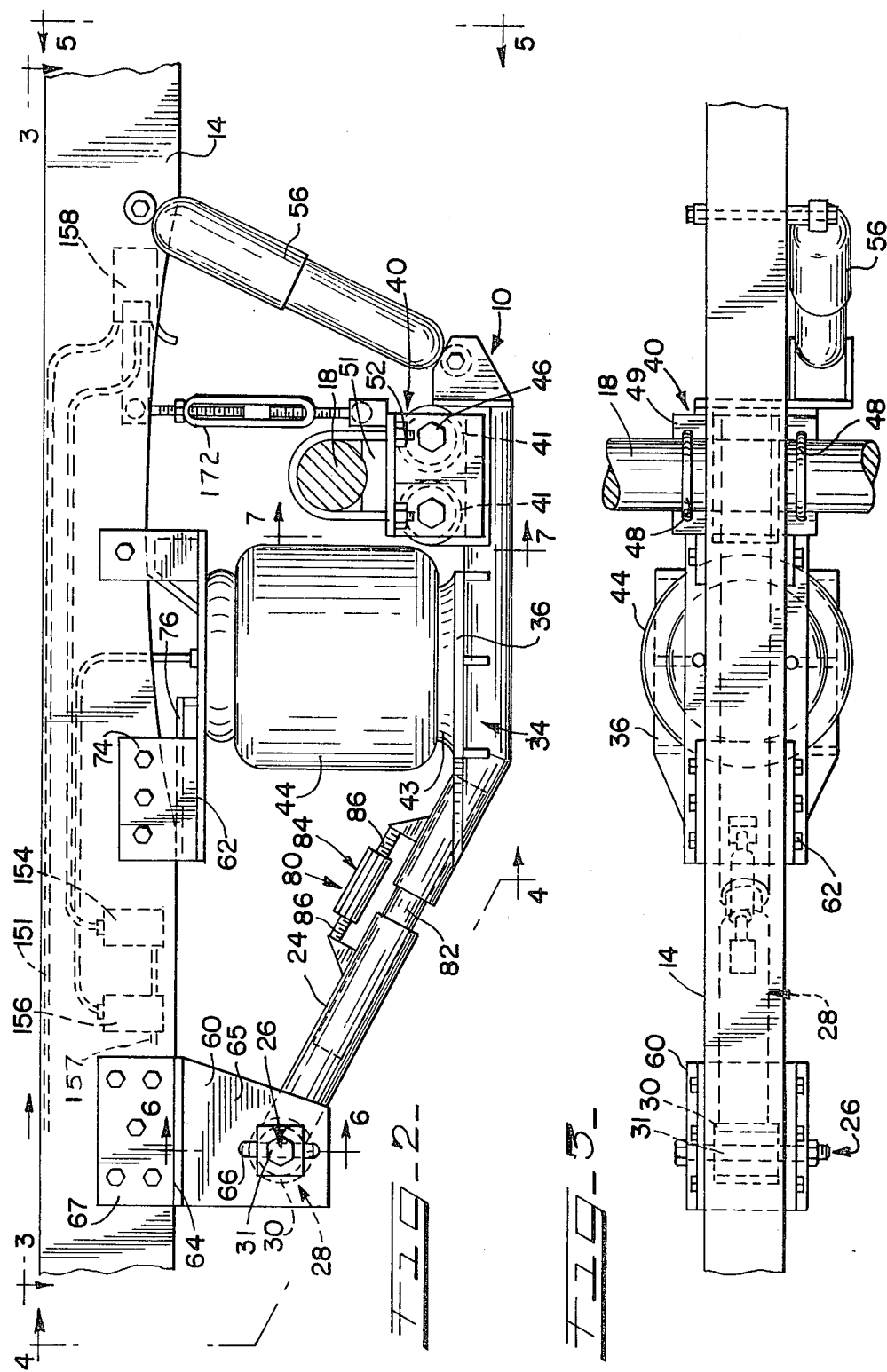

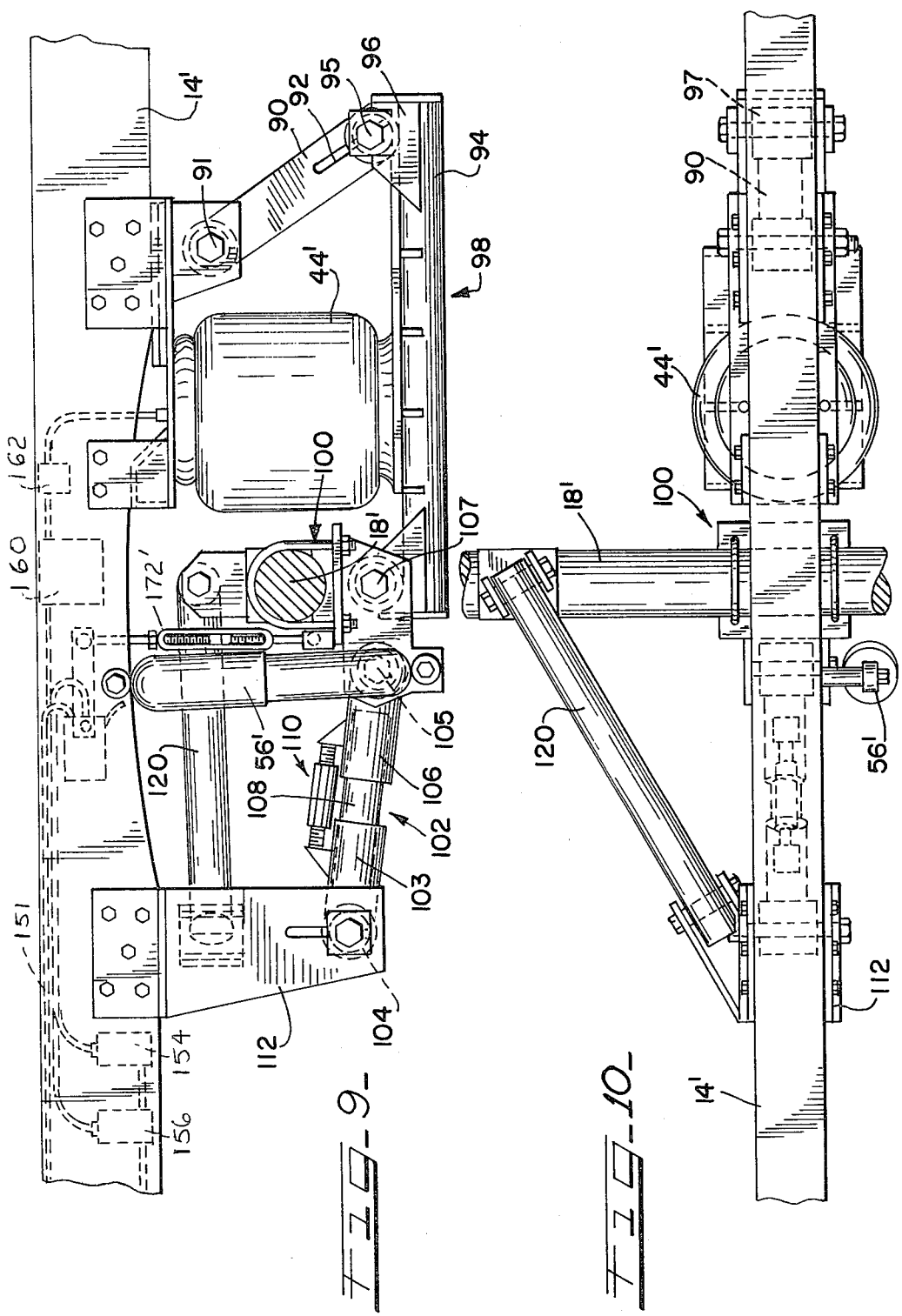

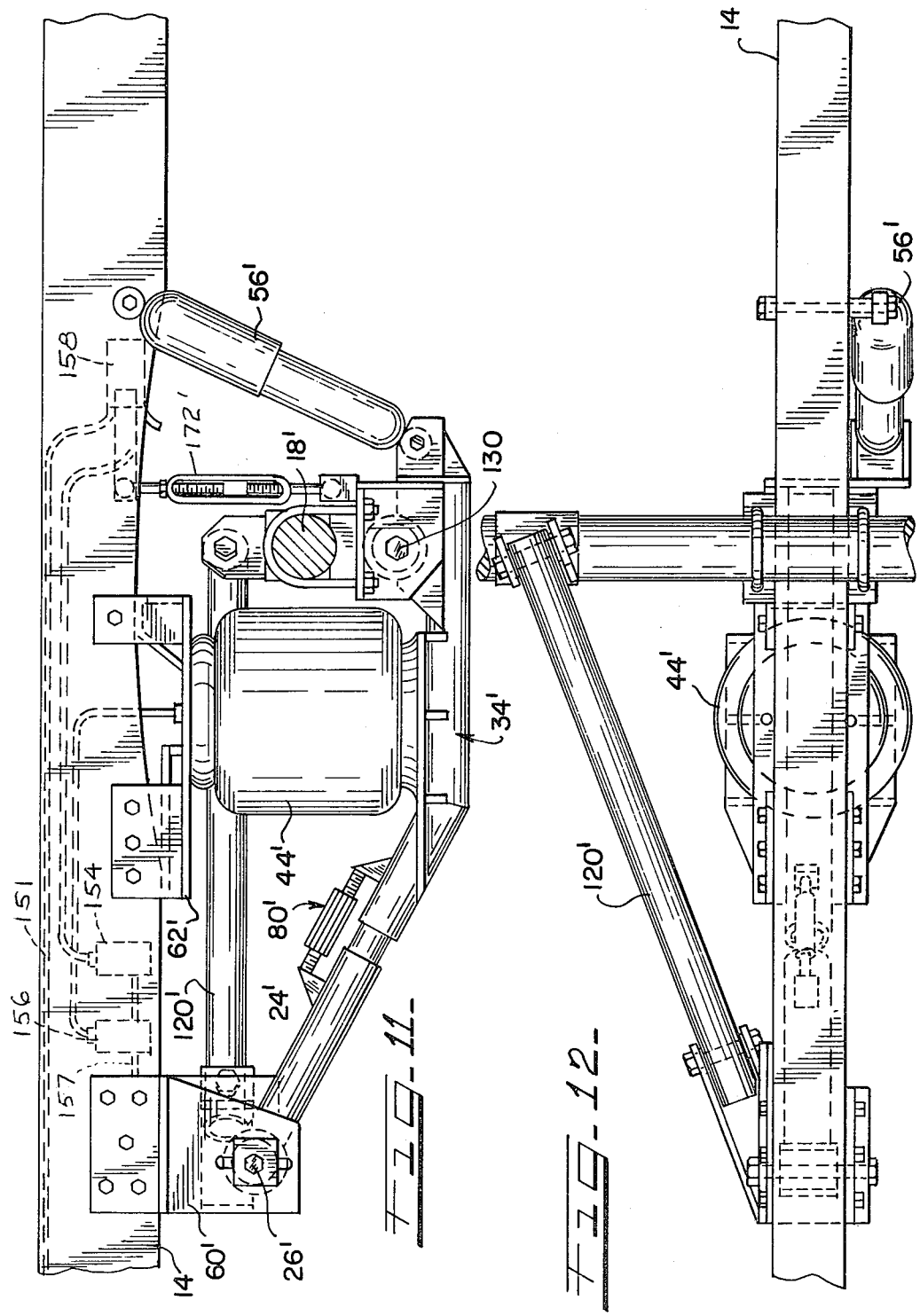

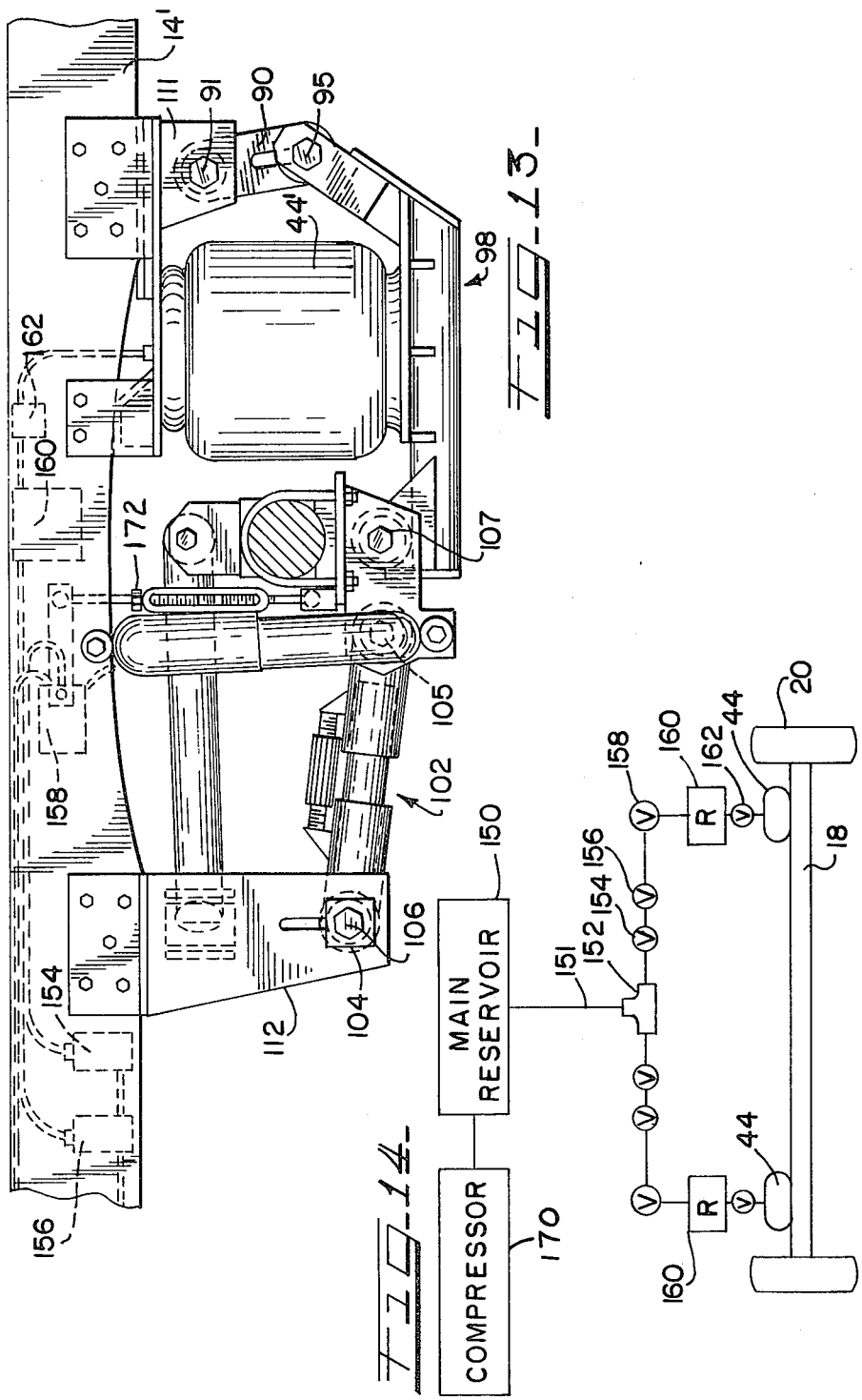

UNIVERSAL AIR SUSPENSION SYSTEM

DESCRIPTION

Technical Field

The present invention relates generally to air suspension systems for motor vehicles and, more specifically, to an improved system which may be easily adapted for mounting as a primary suspension for various types of vehicles regardless of frame construction or size.

The Prior Art

Various types of air suspensions have been proposed and used for vehicles in attempts to improve load bearing and riding characteristics. It is desirable to have a ride that is smooth and stable and which does not transmit the bumps, crevices and other irregularities in the traveling surface to the vehicle frame and, in particular, to its passengers. Especially in large bodied vehicles such as vans, trucks or ambulances heavily loaded in the rear-end, it is important to have a stable and preferably independent suspension for each of the rear wheels to eliminate sway and improve the ride and handling. It has long been proposed to use air springs in such vehicles as supplements to the coil or the leaf springs which provide the primary means of suspension for the vehicle. Use of air springs has been limited, however, because of the inherent lack of stability of such springs which are basically air inflated bags. This lack of stability has necessitated, in most air suspension applications, the use of relatively complicated systems of torque rods, lateral stabilizer bars, bolsters and the like. Such equipment is heavy, reducing the amount of payload which can be carried and these previous systems have been expensive to fabricate and not readily adaptable to a variety of vehicle constructions, including small bodied vans and trucks which are presently popular.

Most prior suspension assemblies generally include one or more hangers mounted on the frame or vehicle chassis. An arm referred to as a carrier arm, radius arm or torque arm, depending on its designed function, is usually pivotally mounted about a forward hanger in a bushing assembly and extends rearwardly toward the vehicle axle. The carrier arm is then connected to a bolster beam or the axle itself. An air spring is generally mounted to the rear of the axle on the opposite side of the axle from the point at which the carrier arm is pivoted. The primary means of suspension and support, such as a coil spring, is usually disposed between a point along the bolster beam or the axle and the vehicle frame. In some designs the carrier arm has been replaced by a type of leaf spring. The use of an air spring in conjunction with a radius arm and a leaf spring has been discussed in a safety air suspension for a trailing axle by the Freuhauff Company, noted as the Freuhauff L2 Safety Air Tandem. The air spring or inflatable bag has not, however, been relied upon as the primary means of suspension.

Examples of prior air spring devices are shown in U.S. Pat. Nos. 3,801,086; 3,664,681; 3,332,701; 3,510,149; 3,285,617; 3,782,753; 3,502,348; 3,918,738; and, 4,099,741. Each of these patents suggest uses of air springs and designs of air suspension but reflect the limitations which have heretofore been assumed to be inherent in the use of an air spring as a primary means of suspension. Moreover, in prior art-type suspensions there was no provision for automotive adjustment of the system to enable the ride provided to be tailored to low speed city driving as opposed to high speed, relatively straight highway driving. If a system were adjusted to provide a relatively smooth highway ride it could not automatically readjust to lower city speeds, resulting in a very stiff ride under such conditions.

SUMMARY AND OBJECTS OF THE INVENTION

The present invention solves many of the problems presented by the prior art by providing an air suspension system which may be relied on as the primary means for supporting the load carried by the vehicle and absorbing the forces imparted by the traveling surface through the wheels and axle of the vehicle. The system is mounted on the vehicle frame by a series of brackets and features, in any of its embodiments as well, an adjusting means. These will allow location of the system vertically and horizontally with respect to the vehicle axles while allowing the system to be mounted on most types of frames and on most vehicles now in operation or which would have need of the advantages offered by an air suspension system.

Accordingly, the air suspension system of this invention includes generally a carrier arm which is pivotally pinned to a forward hanger bracket. In a first embodiment of the invention, the carrier arm includes a portion having a mounting platform for the air spring and means for attaching the end of the carrier arm opposite the pivot point to the axle of the vehicle. The air spring is mounted on the carrier arm between the pivot point and the axle of the vehicle and interposed between the carrier arm and the vehicle frame.

Each embodiment includes means for either adjusting the length of the carrier arm or the length of the assembly horizontally to align the axle and provide for proper tracking of the vehicle wheels. A conventional shock absorber is used at the far end of the carrier arm to damp any severe forces and any tendency to oscillate.

In a second, related embodiment, the carrier arm includes an air spring mounted platform having a non-load transferring link pivotally pinned to the vehicle frame at one end and means for attaching the entire assembly to the axle near its other end. An adjustment arm is again pivotal with respect to a hanger bracket and the mounting platform to provide for a horizontal location of the suspension relative to the axle and the frame. This five point pivoting system effectively supports the entire load of the rear of the vehicle on the air springs alone and provides an independent suspension for each wheel. Again, the air spring is located between the primary pivot points of the suspension system and the axle.

Either embodiment of the system may also include separate torque and tracking arms which extend laterally inwardly between the selected mounting points on the system and the axle to absorb torquing forces which occur when one side of the vehicle axle moves relative to the other. The unique pivotal connections in the present invention also provide for some torquing of the axle itself to eliminate stress on welds and other fixed connections.

In addition, in this unique air suspension system, the air supply to and from the air spring in itself is controlled in a novel manner to soften riding characteristics and provide for a similar quality of ride under both city and highway driving conditions. In the present invention, the main supply reservoir or compressor supplies substantially equal amounts of air through a tee fitting to a levelling valve and then to a small reservoir located adjacent the air spring for each of the rear wheels. It has been discovered that the small reservoirs should have a volume equal to or greater than the volume of the air spring for optimum riding characteristics. In addition, for city driving, a cut-off valve is provided which cancels the operation of the levelling valve to prevent its constant operation. There is also an exhaust valve which will exhaust the air from the air spring to drop the rearend and permit easier loading. Finally, the diameter of the air line between the small reservoir and the air spring has been enlarged and a control valve provided to compensate for differences in ride ordinarily resulting from city as opposed to highway driving.

Experimentation has shown that not only will the system of this invention carry a substantial amount of weight or load over the rear axle, up to 10,000 pounds under dynamic conditions, but that the unique location of the air springs on the same side of the vehicle axle as the pivot point for the system decreases the cycles per second normally incurred by the air spring, thereby making the entire system more efficient. It is estimated that the air springs of the present invention operate at up to 30% less cps than conventional air support or air shock units.

Accordingly, it is an object of the present invention to provide an air suspension system which functions as a primary means for both supporting the load carried by the frame of a vehicle above the axle and for absorbing forces ordinarily transmitted through the wheels and axle of the vehicle to the frame.

It is a further object of the present invention to provide an air suspension system which is easily adaptable for mounting on various types of vehicles having frames of different configurations.

It is another object of the present invention to provide an air suspension system which is adjustable after mounting relative to the axle and the frame of the vehicle.

It is a still further object of the present invention to provide an air suspension system which efficiently utilizes the air supply and provides control means in the air supply system for automatically controlling and adjusting the riding characteristics of the air suspension system.

It is also another object of the present invention to provide an air suspension system which is relatively low in cost to manufacture, easy to install and maintain and reliable in operation.

BRIEF DESCRIPTION OF THE DRAWINGS

FIG. 1 is a side elevational view of a typical van-type vehicle having an air suspension system according to one embodiment of the present invention shown in hidden lines mounted adjacent the axle between the rear wheels;

FIG. 2 is a side elevational view of a first embodiment of the air suspension system according to the present invention shown as mounted adjacent the rear axle of a vehicle and including the air supply system in hidden lines;

FIG. 3 is a plan view of the air suspension system shown in FIG. 2;

FIG. 4 is a cross sectional elevational view taken generally along the line 4—4 of FIG. 2 looking rearwardly toward the axle along the air suspension system shown in FIG. 2;

FIG. 5 is a cross sectional elevational view taken generally along the line 5—5 of FIG. 2 looking forwardly along the air suspension system shown therein;

FIG. 6 is a partial cross sectional elevational view taken along line 6—6 of FIG. 2 showing the pivot point connection of that air suspension system;

FIG. 7 is a partial cross sectional elevational view taken generally along line 7—7 of FIG. 2 showing the axle connection of that air suspension system;

FIG. 8 is a simplified plan view showing the air suspension system of FIG. 9 as mounted adjacent each wheel of the rear axle of a vehicle and including a torque track arm such as shown in FIG. 9;

FIG. 9 is a side elevational view of a further embodiment of the air suspension system of this invention;

FIG. 10 is a plan view of the embodiment of the air suspension system shown in FIG. 9;

FIG. 11 is a side elevational view of the embodiment of the air suspension system shown in FIG. 2 and including a torque and tracking arm extending inwardly toward the axle;

FIG. 12 is a plan view of the air suspension system shown in FIG. 11;

FIG. 13 is a side elevational view of a slightly modified embodiment of the air suspension system generally shown in FIG. 9 disclosing a configuration useful in vehicles having a low rear-end clearance relative to the road; and, FIG. 14 is a schematic view showing an air supply system for supplying and controlling the flow of air to and from the air springs used in connection with the air suspension systems described in this invention.

DETAILED DESCRIPTION OF THE DRAWINGS

While this invention is capable of embodiment in several specifically different configurations, there is shown in the drawings and will be described herein, in detail, three preferred embodiments designed to accomplish related but slightly different functions. It should be understood that the present disclosure is to be considered an exemplification of the principals of the invention and is not intended to limit the invention to the embodiments illustrated.

FIG. 1 shows an air suspension system 10, as generally described herein, installed on a van-type vehicle 12 adjacent left rear wheel 16 on the rear axle 18 of the vehicle. FIG. 1 is meant to be merely illustrative of the type of installation possible for the suspension system described in this application. This system, however, is designed for use on trucks, vans, campers, automobiles or any other type of vehicle for which smoother riding characteristics and better stability are desired.

The present invention, as shown in FIG. 1, is installed in what is called a "leading arm" position so that the support is forward of the rear axle. When the support is rearward of the axle, the position of the suspension is generally referred to as "trailing arm". The leading arm position may provide for greater efficiency in use of the suspension under uniform loading conditions.

In FIG. 2 there is shown, in more detail, a first embodiment 10 of the present invention which is hereafter referred to as the single pivot point embodiment of the present invention. The suspension system shown in FIG. 2 generally includes a carrier arm 24 which extends from a pivot point 26 rearwardly toward the axle 18 of the vehicle. The carrier arm may be constructed from hollow tubular or rectangular channel material and has a first end or pivot portion 28 which is formed as a cylindrical sleeve 30. This end could, of course, also be formed as a rectangular box or any suitable configuration. This sleeve 30 cooperates with a pivot pin 31 inserted therethrough to mount the first end 28 of the carrier arm 24 in a pivotal manner relative to pivot point 26 which is fixed relative to the frame 14 of the vehicle 12 as will be described below.

The pivot portion 28 of the carrier arm 24 extends downwardly from the pivot point 26 shown in FIG. 2 to a generally horizontal platform portion 34. The platform portion 34 may be formed from a channel or circular stock and is integral in this embodiment with the pivot portion 28. The platform portion 34 has a platform 36 mounted on an upper surface thereof facing the underside of the frame 14. The platform 36 is designed to receive the bottom or base 43 of an air spring 44. At the rear of the platform portion 34 is mounted an axle attaching means 40 shown in detail in FIG. 7, for attaching the rear portion of the carrier arm to the axle for the purpose of connecting the air suspension system to the axle of the vehicle. The attaching means 40 includes a pair of cylindrical sleeves 41 having downwardly extending ears 42 which are fixedly attached by welding or similar means to platform portion 34 of the carrier arm 24. Cylindrical sleeves 41 may be formed integrally with the carrier arm and are adapted to be connected, in this embodiment, by a pair of parallel pins 46 secured by nuts 47 over a threaded end thereof. Pins 46 are inserted through a clevis 45 formed by a pair of U-bolts 48 secured over axle 18 and attached to a bearing plate 49 which is, in turn, connected to a pair of spaced downwardly extending ears 50 of the clevis 45. A bearing pad 51 is disposed on bearing plate 49 and is brought against axle 18 by tightening nuts 52 to U-bolts 48. Before pins 46 are inserted through openings in ears 50 and sleeves 41, any space in the interior of sleeves 41 may be filled by resilient material to absorb some torquing forces. Assembly 40 provides a relatively fixed, non-pivotal connection to axle 18.

At the second end of the carrier 24 is a conventional shock absorber 56 having one end mounted on the rear of the carrier arm 24 and the other end mounted to the frame 14. The shock absorber 56 telescopes within itself in the usual manner to damp severe shock which may be transmitted through the wheels by extreme road conditions and thereby prevent oscillation or rocking of the vehicle. This prevents damage to the air spring.

Each embodiment of the air suspension system shown in this invention is easily mounted to the frame of any size vehicle by very simple frame mountings which generally include a forward hanger bracket 60 and an air spring hanger bracket 62. Each of these brackets, as shown in FIGS. 2 through 6, includes a frame having a generally U-shaped configuration and a generally horizontal plate having upwardly spaced flanges on opposite sides. Each of these flanges has a plurality of mounting holes performed in it. These flanges may be mounted on opposite sides of the frame and any differences in spacing compensated for by shimms or the like.

In FIG. 2, the forward bracket 60 includes a horizontal plate 64 having two spaced, downwardly extending carrier arm mounting flanges 65 which include a vertically extending slot 66. Once the upwardly extending flanges 67 have been mounted over the vehicle frame in the desired position, the first end 28 of the carrier arm 24 may be pivotally mounted in the vertically extending slot 66 of the first hanger bracket 60 by inserting a bushing of elastomeric material 68 into sleeve 30 between the sleeve wall and an interior retainer 69. A pin 31 is then inserted through slot 66 and sleeve 30 of the carrier arm 24 and secured at its opposite end by nut 32. Washers 70 are interposed between contacting metal parts in a conventional manner as shown in FIG. 6. This construction permits the carrier arm 24 to pivot freely relative to the hanger bracket 60 and the frame while also permitting it some lateral movement to absorb various stresses due to axle torqueing.

The air spring hanger bracket 62 is mounted in a similar manner on the frame 14. Bracket 62, as shown in FIGS. 2 and 5, also includes a mounting plate 72 which extends horizontally and is attached to a pair of upwardly extending flanges 74 which may be disposed on opposite sides of the frame member and bolted thereto in the desired position. Flanges 74 may be split on each side, as shown in FIG. 2, and lengthened in height to accommodate a particular vehicle frame. As shown, bracket 62 also includes bearing platform 76 to abut the underside of the channel or box frame of the vehicle for added rigidity. To the extent that hanger brackets 60 and 62 are not universally adaptable to most vehicle frames, it is apparent that suitable hangers can be very inexpensively fabricated, if necessary, to mount the air suspension system on any vehicle frame.

Once both of the hanger brackets have been mounted to the frame, the first end 28 of the carrier arm 24 pivotally pinned to the first hanger bracket, and the second end of the carrier arm attached to the axle, the entire assembly may be adjusted relative to the frame and the axle so that the front and rear axles are in alignment and all wheels track properly. This is accomplished easily by use of the adjusting means 80 shown in FIG. 2. To accomplish adjustment as shown in FIG. 2, the pivot portion 28 of the carrier arm 24 is formed in separate sections which are joined by an internal circular bar member 82. This allows pivot portion 28 to be telescoped to increase or decrease its length and the length of the entire assembly 10. The junction of the two sections is spanned by a turnbuckle-type member 84 comprising two separated, complementary threaded portions 86 connected by elongated nut 88. As the nut 88 is moved on the complementary, but opposite threads 86, it draws the sections of pivot portion 28 closer together or separates them in accordance with the direction of rotation. When the desired alignment position is reached inner member 82 may be welded in position relative to pivot portion 28 so that further adjustment is made unnecessary.

The air suspension assembly shown in FIGS. 2 and 11 has a load bearing ratio, between the carrier arm and the air spring, of approximately 1:1.37. In other words, it is believed the air spring, when used in the embodiment shown in FIGS. 2 and 11, will carry about 50% of the load whereas in prior systems the spring normally carries only about 30% of the load. Carrier arm 24 is both load and weight bearing.

A second embodiment of the air suspension system of this invention is shown in detail in FIGS. 8, 9 and 10 and in a slightly modified form in FIG. 13. This embodiment is referred to as a "five point" system since it involves five connections, each of which may pivot relative to the frame 14. It functions in the same way, however, as the system shown in FIG. 2 since the air spring is located on the same side of the axle as its primary pivoting members.

Specifically, as shown in FIG. 9, this embodiment includes a pivotal link 90 which is pivotally mounted to the frame 14 at its upper end and pivotally mounted to an air spring mounting platform 94 at its lower end. The pivotal connections are similar in construction to those described above. The lower end of link 90 has an elongated slot 92 formed parallel to the main axis of the link. In this slot rides pin 95 which is mounted through a pair of spaced ears 96 formed in a first end of the air spring mounting platform 94 and a sleeve 97 formed in the end of link 90. Link 90 and mounting platform 94 together form a carrier arm 98 which is similar in appearance to the carrier arm shown in FIG. 2 but carries no load.

Mounting platform 94 has an air spring 44' mounted thereon and contains, at its opposite end, an axle attaching means 100 for attaching the entire carrier arm 98 to the axle 18' in a manner discussed above. Pivotally connected to the axle attaching means 100 is an adjustment arm 102. The adjustment arm 102 includes a first section 103 and a second section 106 joined in telescoping relation by an internal rod 108 so that the separate sections may be moved together by an adjustment connection 110 similar to that in FIG. 2 and discussed above.

The very forward end of the first section 104 of the adjustment arm 102 includes a cylindrical sleeve 104 through which arm 102 may be pivotally pinned to forward hanger bracket 112 which is similar in construction to hanger bracket 60. The purpose of adjustment arm 102 is to allow alignment of the axles of the suspension system after mounting. Alignment is accomplished in the manner described above.

A shock absorber 56' is connected between the frame 14' and the air suspension system as previously described. In addition, a torque and track arm 120 spans the distance from the forward hanger bracket 112 to the axle 18'. A torque arm 120 is pivotally mounted between the axle 18' and each rear air suspension in the wishbone configuration as shown in FIG. 8. The arm compensates for axle torqueing, maintaining lateral stability and proper wheel tracking and, in combination with the pivotal connections of this embodiment, provides for totally independent movement of each rear wheel.

FIG. 13 shows a modified version of FIG. 9 in which link 90 is shortened and a portion of mounting platform 98 is extended upwardly toward the shortened link at approximately a 55° angle from the horizontal. This provides for clearance of the rear of the suspension over obstacles in a rough terrain.

The suspension system shown in FIG. 9 is mounted to the frame 14' by two mounting brackets, similar to those previously discussed, which may be secured in a desired position to the frame. The pinned connection 91 which secures link 90 to bracket 111 and the pinned connection 106 which secures arm 102 to bracket 112 are similar in construction and operation to previously described pivotal connections in that they allow free pivotal movement about a point. Unlike the embodiment of the present invention shown in FIG. 2, which has only one pivotal connection 26, the embodiment of FIG. 9 has five such connectors at 106, 105, 107, 95 and 91. As a result, while adjustment arm 102 absorbs some torqueing and pulling forces and link 90 absorbs some axle arcing and weight, air spring 44' is, in this embodiment, totally load bearing. In other words, the five point design offers no substantial support by the carrier arm 98, but rather relies almost totally for support of the load and to absorb the forces imparted to the axle by the wheels on the air spring. In this case, almost 100% of the effective load and forces are carried by the air spring, unlike any of the prior art.

As mentioned above, the pin connection shown in use in FIG. 9 and by all the embodiments of the invention are similar to the pin connections and bushings which are common in the prior art. They consist of an outer cylindrical sleeve which is generally formed on the link or carrier arm. An elastomeric means is packed between this outer sleeve and an inner sleeve or casing and a steel pin threaded at its opposite ends or having a hexagonal heat at one end and a threaded portion is inserted through the casing and tightly secured by a nut.

Torque arms 120 may also be used in any of the embodiments of the present invention to accommodate lateral and torqueing forces and to assist in providing essentially independent suspension for each of the rear wheels of the vehicle. Without such torque arms and the pivotal connections 107 in FIGS. 9 and 13 or 130 in FIG. 11, the suspension shown in FIG. 2, for example, will exhibit interdependency based upon relative movement of the axle. In otherwords, if one wheel moves, lateral forces or movements due to such movement will be transmitted to the other wheel. On the other hand, with the use of the torque arm 120 in FIGS. 9, 11 and 13, such forces will be absorbed to prevent the dependence of one wheel upon another and assure an independently operating suspension and improved riding characteristics.

FIG. 11 shows a single point "leading arm" type configuration very similar to that shown in FIG. 2 except in two important respects. First, a torque arm 120' is incorporated to compensate for axle torqueing. Second, the two relatively fixed parallel pin bushings, disposed under the axle in FIG. 2 as part of the axle attaching means, are replaced by a single pivotal pinned connection 130. This second pivotal connection 130 provides for independence of the air suspension similar to that obtained through the five point embodiment.

The air spring 44' may be made of any suitable type of elastomeric material such as rubber formed as a hollow bag which is inflatable and flexible. Such springs are commercially available. The type of spring used in the present invention is a rolling sleeve-type which is more flexible and designed to give a better riding characteristic than the more rigid single lobe or double convolute air springs often used in the past on truck trailers.

Another unique feature of the present invention is the air supply system to the air spring, as shown in FIG. 14. As is normal in such systems, a source of air, usually an air compressor 170, is available which supplies a large main reservoir 150. In the present system a ¼ inch interior diameter flexible air line 151 extends from the main reservoir 150 to a tee fitting 152 which divides the air supply between each wheel. On each side of fitting 152 air moves through air line 151 to cut-off valve 154, exhaust valve 156, levelling valve 158 and into a small reservoir 160. A small reservoir 160 is located adjacent the air spring mounted on the air suspension system adjacent each wheel on the axle. It has been discovered that if each small reservoir 160 has a volume approximately equal to or slightly greater than the volume of the air bag or spring itself, an optimum ride would be obtained. It has also been discovered that in city driving the levelling valve 158, which is designed to keep the air spring filled so the frame is parallel to the axle, will often have to operate the compressor constantly to obtain this result due to the number of cycles the bag undergoes. Thus, there is provided the cut-off valve 154 which may be activated during city driving to cancel the action of the levelling valve 158 and reduce cycling of the compressor.

A control valve 162 is also preferably located in the air line between the small reservoir 160 and the air spring 44'. This valve 162, which may be an orifice or needle valve, controls the rate of air flow into the spring as desired. It may be adjusted by hand to decrease or increase air flow to obtain a softer or stiffer ride, respectively. The section of air line between the small reservoir and the air spring may be increased to ½ inch I.D. to reduce the heat and pressure in the line and improve the response of the air spring 44'. The valves which are not mechanical, such as cut-off 154, exhaust 156 and levelling valve 158 are 12 volt solenoid operated valves available commercially.

In the installation of the air suspension system, the air supply line 151 may be connected to air spring 44' through hanger platform 62. A turnbuckle 172 is attached at one end to the axle hanger assembly 40 or 100 and at its opposite end to levelling valve 158 so that the position of the levelling valve 158 may be adjusted as necessary.

In the operation of the system, as shown in this embodiment and described in FIG. 2, a load applied to the axle of the vehicle through the frame of the vehicle is borne through the carrier arm 24 in part and in part through the air spring 44. A force is transmitted through the wheel to the axle 18, similarly borne by the suspension. In response to such forces and such loads the carrier arm 24 pivots around pivot point 26 while the air spring is deflected or depressed so that air is exhausted into small reservoir 160. It is also possible, in order to accommodate loading of the vehicle to drop the back end of exhausting the exhaust solenoid to deflate the air bag to the degree necessary.

When the air suspension system of FIG. 9 is in use, it is seen that no load is supported through the link portion of the carrier arm or transmitted through any other portion of the suspension system except for the air spring because of the primary pivot points 91 and 95 and pivotal connection 107. Likewise, any forces imparted through the wheels to the axle are transmitted directly to the air spring which is then deflected in response to these forces. It is believed that adjustment arm 102 bears some load due to push and pull forces caused by starting and stopping. It has been discovered in actual experimental situations that the air suspension system of FIG. 9 will support a load of up to 5,000 pounds per wheel over rough terrain without any problem.

In the operation of any of the preferred embodiments of the air suspension system of the present invention, air is initially supplied, under pressure from a source, such as a conventional air compressor 170 through air supply line 151, to a main reservoir which supplies the suspension systems adjacent both rear wheels. As the load over the rear of the vehicle is increased or when the wheels move in response to rough terrain the air spring or bag 44, which is filled with air under pressure, will be compressed and air back through the supply system, or in the embodiments having a small reservoir 160, into that reservoir.

In cases of extreme compression of the air spring, for example, if the vehicle is cornering at fairly good speed, the air supply system will compensate. The air spring to the inside of the corner will be compressed to a substantial degree by allowing system air to be released to the atmosphere through exhaust valve 156 and exhaust outlet 157 while the spring to the outside of the corner may be inflated to keep the frame level. Overall levelling is accomplished by levelling valves 158. When the vehicle is once again on a straight away, air is immediately returned to the compressed spring from small reservoir 160 and the compressor activates to raise the pressure in the overall air supply system to the desired level.

Flow of air to the spring from the small reservoir 160 is enhanced by use of a larger diameter air supply line 151 in this section of the system. A control valve 162 may also be added in line 151 between reservoir 160 and spring 44 to allow more or less air to pass back and forth through the line. It can be appreciated that, in city driving, the spring 44 will tend to be deflected many more times at more rapid intervals than in highway driving. This would ordinarily tend to make the ride uneven unless the compressor does not operate continuously or overly firm if the air supply to the spring is maintained constantly. However, control valve 162 limits the air flow between spring 44 and small reservoir 160 so that the stiffness or firmness of the ride can be adjusted by manually adjusting valve 162.

Although the invention has been described in some detail with reference to some preferred embodiments thereof, it will be understood that modifications other than those specifically described may be effected without departing from the scope and spirit of the invention. It is only limited as set forth in the attached claims.

I claim:

1. An air suspension system for a vehicle, said vehicle having a frame, a front axle, at least one rear axle and wheels mounted near opposite ends of said rear axle, said air suspension system being mounted adjacent each wheel on said rear axle to support at least that portion of the load of said vehicle applied through said frame to said axle and to absorb forces imparted to each wheel and said axle during movement of said vehicle, said air suspension system including carrier arm means having a pivotal link means at the rear end thereof, one end of said pixotal link means being pivotally connected to said frame, and a mounting platform portion, said mounting platform portion being pivotally connected to the other end of said pivotal link means, said carrier arm means being connected to said axle by an axle hanger assembly being fixedly attached to said mounting platform portion of said carrier arm means at a lower portion thereof, said air suspension system including means to adjust the alignment of said axle after mounting of said air suspension, said means to adjust alignment being pivotally connected between the forward end of said carrier arm means and said frame, and an air spring disposed on said mounting platform portion of said carrier arm means between said pivotal link means and said axle hanger assembly and interposed between said mounting platform portion and said frame.

2. The air suspension system of claim 1 additionally including a shock absorber mounted between said frame and said air suspension system and torque and track arm means pivotally mounted between said axle and said frame to assist in making said wheel adjacent said air suspension respond independently from other wheels of said vehicle.

* * * * *

UNITED STATES PATENT AND TRADEMARK OFFICE
CERTIFICATE OF CORRECTION

PATENT NO. : 4,379,572
DATED : April 12, 1983
INVENTOR(S) : William E. Hedenberg It is certified that error appears in the above-identified patent and that said Letters Patent is hereby corrected as shown below:

Column 10, line 29, "fixedly" should read --pivotally--.

Signed and Sealed this

Twenty-fourth Day of September 1985

[SEAL]

Attest:

DONALD J. QUIGG

*Attesting Officer*

*Commissioner of Patents and Trademarks—Designate*

UNITED STATES PATENT AND TRADEMARK OFFICE
CERTIFICATE OF CORRECTION

PATENT NO. : 4,379,572
DATED : April 12, 1983
INVENTOR(S) : William E. Hedenberg It is certified that error appears in the above-identified patent and that said Letters Patent is hereby corrected as shown below:

Column 10, line 44, "pixotal" should read -- pivotal --.

Column 10, line 49, "fixedly" should read -- pivotally --.

This certificate supersedes Certificate of Correction issued September 24, 1985.

Signed and Sealed this

Third Day of June 1986

[SEAL]

Attest:

Attesting Officer

DONALD J. QUIGG

Commissioner of Patents and Trademarks